Figure 1:
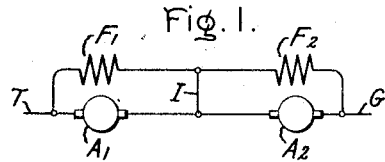

J. G. V. LANG.
DEVICE TO PREVENT SKIDDING.
APPLICATION FILED JAN. 20, 1915.

1,191,602.

Patented July 18, 1916.
2 SHEETS—SHEET 1.

Witnesses:
Earl G. Klock
J. Ellis Glen

Inventor:
Johan G. V. Lang,
by
His Attorney.

J. G. V. LANG.
DEVICE TO PREVENT SKIDDING.
APPLICATION FILED JAN. 20, 1915.
1,191,602.
Patented July 18, 1916.
2 SHEETS—SHEET 2.
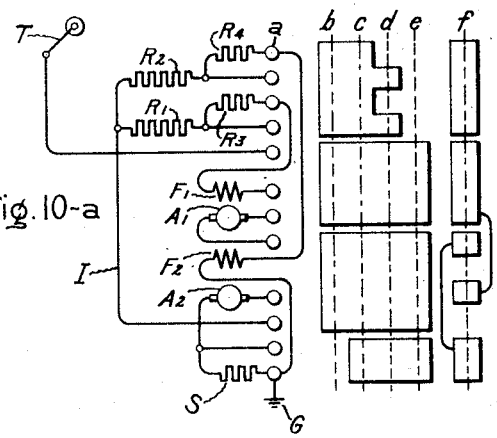
Fig. 10-a
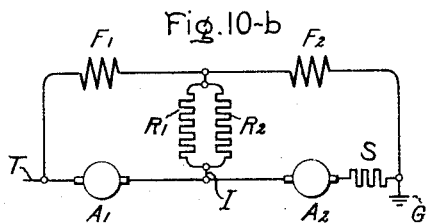
Fig. 10-b
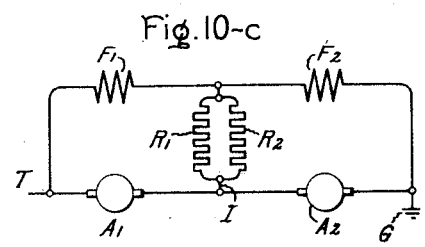
Fig. 10-c
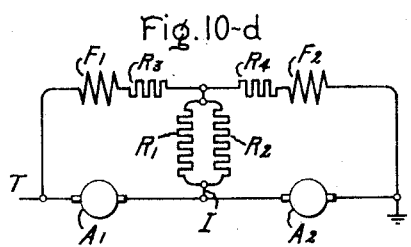
Fig. 10-d
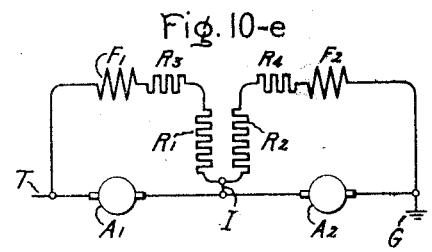
Fig. 10-e
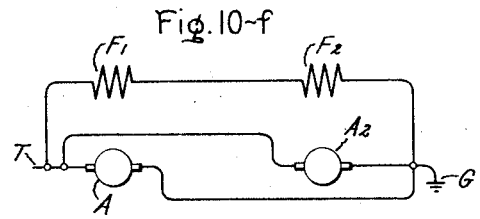
Fig. 10-f
Witnesses:
Earl G. Klock.
J. Ellis Glen.
Inventor:
Johan G. V. Lang,
by Allen S. Davis
His Attorney.

UNITED STATES PATENT OFFICE.

JOHAN G. V. LANG, OF NEW YORK, N. Y., ASSIGNOR TO GENERAL ELECTRIC COMPANY, A CORPORATION OF NEW YORK.

DEVICE TO PREVENT SKIDDING.

1,191,602.  Specification of Letters Patent.  Patented July 18, 1916.

Application filed January 20, 1915. Serial No. 3,239.

*To all whom it may concern:*

Be it known that I, JOHAN G. V. LANG, a subject of the King of Sweden, residing at New York, in the county of New York, State of New York, have invented certain new and useful Improvements in Devices to Prevent Skidding, of which the following is a specification.

This invention relates to the prevention of skidding in traction motors which are acting as generators to return energy to the line. It is especially applicable to a system of regenerative control in which the motor armatures may be connected in series and given an independent shunt characteristic.

One of the most valuable features of regenerative braking is that it automatically prevents skidding or slipping of the wheels, due, for instance, to a too rapid application of the braking action. This is normally true, particularly when the motors are working independently, for then, should one set of wheels slip, the regenerative load on the motor connected to these wheels is immediately relieved, and the wheels are rotated in the forward direction by current taken from the line, thereby enabling them to get a new grip. If, however, the motor armatures are connected in series and are given a shunt excitation independent of the armatures, this feature is not inherent. At the same time, the condition may exist that the electromotive force of the motor which is actively regenerating will be sufficiently large to force a small current into the line, even though one motor is inactive. This current must pass through the armature of the motor connected to the skidding wheels, and is in an opposite direction to the normal motoring current. The field of the skidding motor, however, being independently excited, maintains its same polarity. This motor, therefore, tends to keep on skidding, and may even be driven backward. Its braking effect is practically zero, and the braking action of the non-skidding motor is valueless, as its voltage will only be just above line voltage, and hence it can only regenerate a very small current. Such a condition is commonly found at a time when the car is coasting at high speed and the controller is brought from the high speed position to one where the motors are in series and given a strong shunt characteristic, as, for instance, when a quick stop is required in emergencies. It is evident, then, that such a failure of braking effect, although an exceptional occurrence, comes at a time when its effect would be disastrous due to its coincidence with emergency requirements.

The object of my invention is, then to overcome skidding, with its attendant results, in a system of regenerative control where the motor armatures may be arranged in series and the motors are given a shunt characteristic which is independent of the condition of the armature circuit. I accomplish this result by making the hitherto independent shunt excitation dependent on the condition of the armature circuit, as, for instance, by means of an interconnection between the conductor joining the motor armatures and the conductor joining field windings which govern the shunt excitation.

Figure 2:
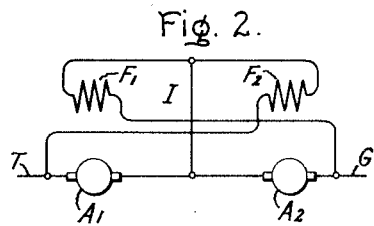
Figure 3:
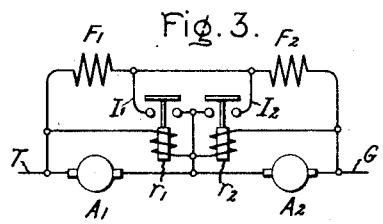
Figure 4:
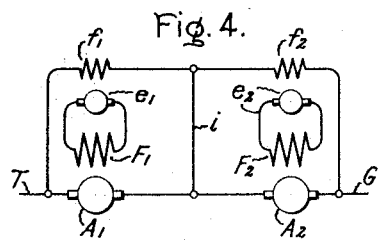

My invention will be more readily understood by reference to the accompanying drawing and the following description thereof:

Figures 1 to 3 show my invention applied to shunt motors whose fields are excited directly from the line. Fig. 4 shows its use with shunt motors which are separately excited. Figs. 5 to 8 show my invention applied to series motors whose excitation is determined wholly or in part by means of motor generators. Fig. 9 shows the use of series motors with a storage battery, the excitation of the fields being also controlled by storage batteries. Fig. 10$^a$ shows a method of controlling two shunt motors arranged to embody my invention, while Figs. 10$^b$ to 10$^f$ shows the connections obtained at the various steps of the controller.

In Fig. 1, two motors having armatures $A_1$ and $A_2$ connected in series between a trolley T and ground G are shown as provided with shunt field windings $F_1$ and $F_2$ also connected in series across the line, this latter arrangement being preferable to save winding space. An interconnection I is provided between the conductor joining the field windings and that joining the armature. If this interconnection were omitted, an action such as that already described might readily occur, and the non-skidding generator might force a current through the armature of the skidding generator in a direction opposite to the motoring current. At the same time, it will be seen that the direction of the field current would be independent of the action of the armatures. The result would be a tendency for the skidding motor to turn in a backward direction, and the skidding would be accentuated rather than relieved. If, however, an interconnection is used such as is here shown, it will be seen that the field strength of either motor is dependent upon the electromotive force of the corresponding armature. Accordingly, if during regeneration the armature $A_1$ should suddenly stop rotating, its electromotive force would drop to zero. The armature, then, constitutes merely a low resistance shunt across the field winding $F_1$, and the current therein would be reduced to zero, or even reversed slightly. At the same time, the potential upon the field $F_2$ will be doubled, and this might cause the generator $A_2$ to continue to force current back into the line. In this case, however, the current in the field winding $F_1$ being reversed, a motoring torque would be created which would tend to rotate the motor $A_1$ in the forward direction and thereby relieve skidding. If conditions are such that the potential generated by the single motor $A_2$ is not sufficient to continue to force a current back into the line, then motoring current will be taken from the line, which will rotate both armatures in the forward direction and relieve the skidding motor. This arrangement, however, might not be suitable during propulsion, because there might not be an even division of load between the motors, and it would be advisable with this arrangement to interrupt the interconnection during propulsion, or to insert resistance therein, as is illustrated in the second sheet of the drawings. By crossing the fields relatively to the armatures, as shown in Fig. 2, this difficulty can be avoided. Similar reference characters are here used to refer to similar parts, as in Fig. 1. With this connection, if the motor $A_1$ skids, the current in field winding $F_2$ will be reduced to zero, or even slightly reversed. As a result, the electromotive force of the generator $A_2$ will be sufficiently reduced so that motoring current will be supplied from the line, and the skidding relieved. The sensitiveness of the automatic action can be regulated by the use of a resistance in the interconnection I, as shown in the second sheet of the drawings.

In certain cases it may be advantageous to use automatic switches such $r_1$, $r_2$, to influence the fields in such a manner as to reduce the torque of the skidding motor. In Fig. 3 these relays serve to close the circuit of interconnections $I_1$, $I_2$, when the electromotive force of the corresponding armature drops below a certain value. It will be seen that after the interconnection is completed by means of these switches, the operation is identical with that in Fig. 1.

As is well understood, the shunt characteristic may be obtained by independent excitation, and, accordingly, in Fig. 4 I have shown an arrangement wherein the field windings are supplied by independent exciters $e_1$, $e_2$ driven in any suitable manner. These exciters are provided with field windings $f_1$, $f_2$, which are connected in series across the line and are interconnected so as to be dependent upon the electromotive force of the armatures $A_1$, $A_2$, by means of an interconnection $i$. Although the action is now indirect, it will be seen that the mode of operation is essentially similar to that described in connection with Fig. 1.

Figure 5:
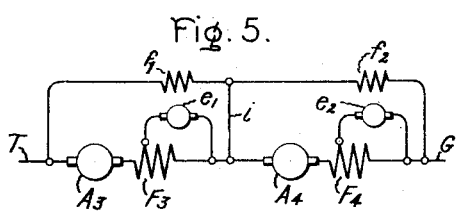

It will be understood that my invention may be equally well applied to traction units using series motors wherein the shunt characteristic is obtained by means of an independent source of current acting on the whole or a part of the series field winding. In Fig. 5, the motor armatures $A_3$, $A_4$, supplied with series field windings $F_3$, $F_4$, are connected in series with each other between trolley and ground. The independent source of current is here illustrated by the exciters $e_1$, $e_2$, supplied with field windings $f_1$, $f_2$, and an interconnection $i$ is applied in the same manner as in Fig. 4. In case the motor $A_3$ stops rotating, the potential across the field winding $f_1$ will be immediately reduced, or even slightly reversed, and as a consequence the current in the field winding $F_3$, which is controlled by the exciter $e_1$, will be reduced to zero, or even slightly reversed. In either case a motoring torque will be created in the motor $A_3$, and the skidding will be relieved.

Figure 6:
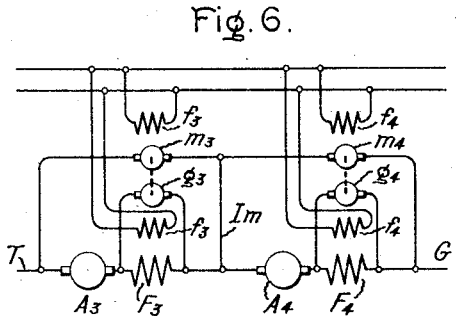
Figure 7:
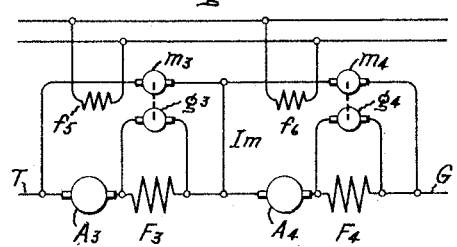

Since the voltage of a dynamo electric machine used as an independent source of excitation may be varied not only by varying its field current, but also by varying its speed, it may be desirable to provide an arrangement such as is illustrated in Fig. 6. In this case a motor generator set having a motor $m_3$ and a generator $g_3$ constitutes the independent source of current for the field winding $F_3$ of the motor $A_3$. A similar arrangement of motor $m_4$ and generator $g_4$ is provided in connection with the field winding $F_4$ of the motor $A_4$. The excitation for the motor generator sets is provided by means of separate field windings $f_3$, $f_4$, supplied from an independent source. With such an arrangement an interconnection $I_m$ is provided between the conductor connecting the armatures of the motor generator sets and the conductor connecting the traction motors. The skidding of one traction motor will result in a reduction of the electromotive force applied to the motor of the corresponding motor generator set, with a consequent reduction in the speed thereof and in the voltage applied to the field winding of the traction motor. Evidently, a similar result is thereby secured as with the arrangement already described. If desired, a single field winding may be used for each motor generator set, and in Fig. 7 I have illustrated such field windings $f_5$ and $f_6$. The operation of this arrangement is identical with that of the arrangement in Fig. 6.

Figure 8:
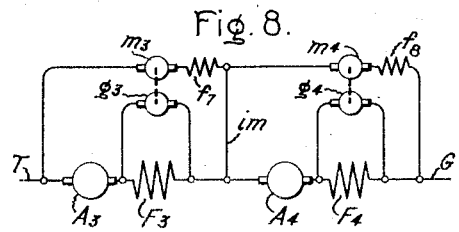
Figure 9:
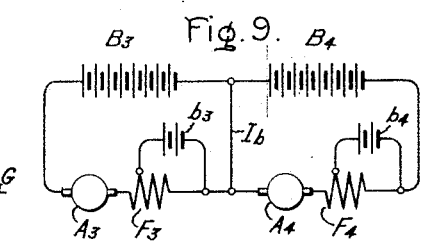

Fig. 8 shows still another arrangement, where a single field winding $f_7$, $f_8$ is provided for each motor generator set and is connected in series with the motors of these sets across the line. The interconnection $i_m$ is now used, similarly located but performing a double function of reducing the voltage of the independent source by reducing both the speed of the motor generator set and its excitation.

With a self-contained traction unit, where the motors are supplied with current from a storage battery, my invention may be equally well applied by means of such an arrangement as is shown in Fig. 9, where the battery is divided into two parts $B_3$ and $B_4$, and an interconnection $I_b$ is provided between the two halves of the battery and the traction motors. In this case I have also illustrated the independent source of excitation for the field windings $F_3$ and $F_4$ as furnished by small storage batteries $b_3$ and $b_4$, which are applied to a portion of the series field windings of the traction motors. It will now be seen that during ordinary operation conditions are exactly the same as without the use of my invention, but that the condition of skidding will be relieved by making the traction motors practically independent of each other.

In order that my invention may be readily applied by one skilled in the art, I have, in Fig. 10ª, illustrated a method of control for such an arrangement as was illustrated in Fig. 1. The reference characters used in that figure refer to corresponding parts in this figure, and in addition I have provided a starting resistance S and resistances $R_1$ to $R_4$, whose use will be later explained. The various elements are illustrated as connected to the fixed contacts $a$, which are operatively related to the moving parts of a drum controller adapted to effect five different connections at the steps $b$ to $f$. These connections are illustrated in the corresponding diagrams of Figs. 10ᵇ to 10ᶠ. At the first step $b$, connections are established with a starting resistance S, in series with the motor armatures, and with the resistances $R_1$, $R_2$, in parallel with one another and in series with the interconnection I. At step $c$ the starting resistance is short-circuited. At step $d$ the field current is reduced by the insertion of resistances $R_3$ and $R_4$ in series with the field windings. At step $e$ the resistances $R_1$ and $R_2$ are removed from the interconnection and made a part of the field regulating resistances. At step $f$ the motor armatures are thrown in parallel between the trolley and ground while the fields are shown as connected directly across the line. As soon as the motors are connected in parallel the need for my invention ceases, and I have, therefore, shown but one parallel step, although it will be understood that the practical embodiment of a traction unit would doubtless require more than one such step. The fundamental operation of these specific arrangements is exactly similar to that already described, with the added features of increased sensitiveness and more equal division of load as previously noted.

While I have herein illustrated various specific arrangements embodying my invention, it will be understood that I seek to cover in the appended claims not only the specific arrangements shown and described, but all other equivalent arrangements which embody my invention.

What I claim as new and desire to secure by Letters Patent of the United States, is:—

1. The combination of a plurality of traction motors arranged for regeneration, comprising armatures connected in series with one another and field windings, auxiliary sources of current connected to the respective field windings, and means whereby the potential of an auxiliary source is reduced when a motor skids.

2. The combination of a plurality of traction motors, arranged for regeneration, comprising armatures connected in series with one another and field windings, auxiliary sources of current connected to the respective field windings comprising dynamo-electric machines, and means whereby the excitation of a dynamo-electric machine is reduced when a motor skids.

3. The combination of a plurality of traction motors arranged for regeneration, comprising armatures connected in series with one another and field windings, auxiliary sources of current connected to the respective field windings comprising dynamo-electric machines, and means whereby the speed of a dynamo-electric machine is reduced when a motor skids.

4. The combination of a plurality of traction motors arranged for regeneration, comprising armatures connected in series with one another and field windings, auxiliary sources of current connected to the respective field windings comprising dynamo-electric machines, and means whereby both the speed and the excitation of a dynamo-electric machine are reduced when a motor skids.

5. The combination of a source of supply, a plurality of series traction motors arranged for regeneration having series field windings therefor, conductors joining said motors in series with one another across said source, auxiliary generators connected across some part of the respective motor field windings, field windings for said generators energized from said source, and means for rendering the degree of energization of the field winding for an auxiliary generator dependent on the counter-electromotive force of a corresponding motor.

6. The combination of a source of supply, a plurality of traction motors arranged for regeneration having series field windings, conductors joining said motors in series with one another across said source, auxiliary motor generator sets having their generators connected across some part of the respective traction motor field windings, the motors of said sets being connected in series across said source, and an interconnection between the common terminal of two motors and a corresponding joining conductor.

7. The combination of a source of supply, a plurality of traction motors arranged for regeneration having series field windings, conductors joining said motors in series with one another across said source, auxiliary motor generator sets having their generators connected across some part of the respective traction motor field windings, and provided with common series field windings for the motors and generators of said sets, the motors and field windings of said sets being connected in series across said source, and on interconnection between a joining conductor and the common terminal of two auxiliary motors.

In witness whereof, I have hereunto set my hand this 18th day of January 1915.

JOHAN G. V. LANG.

Witnesses:
R. TILESTON,
C. H. COUGHLIN.

Copies of this patent may be obtained for five cents each, by addressing the "Commissioner of Patents, Washington, D. C."